United States Patent [19]
Brock et al.

[11] Patent Number: 5,672,649
[45] Date of Patent: Sep. 30, 1997

[54] PROCESS FOR PREPARING AQUEOUS COATING AGENTS USING MODULAR SYSTEMS

[75] Inventors: Thomas Brock, Hürth; Jürgen Döbert, Sprockhövel, both of Germany

[73] Assignee: Herberts GmbH, Wuppertal, Germany

[21] Appl. No.: 707,268

[22] Filed: Sep. 4, 1996

Related U.S. Application Data

[63] Continuation of Ser. No. 184,587, Jan. 21, 1994, abandoned.

[30] Foreign Application Priority Data

Jan. 26, 1993 [DE] Germany ............... 43 01 991.9

[51] Int. Cl.$^6$ ........................................... C08L 75/00
[52] U.S. Cl. ........................................... 524/507; 524/457
[58] Field of Search ........................................... 524/457, 507

[56] References Cited

U.S. PATENT DOCUMENTS

| | | | |
|---|---|---|---|
| 4,730,020 | 3/1988 | Wilfinger et al. | 524/555 |
| 5,011,881 | 4/1991 | Fujii et al. | 524/457 |
| 5,236,995 | 8/1993 | Salatin et al. | |

FOREIGN PATENT DOCUMENTS

| | | |
|---|---|---|
| 2107351 | 1/1992 | Canada. |
| 91/14513 | 10/1991 | WIPO. |

*Primary Examiner*—Edward J. Cain
*Attorney, Agent, or Firm*—Merchant & Gould, Smith, Edell, Welter & Schmidt

[57] ABSTRACT

A process for preparing aqueous coating agents with adjustable optical effects by mixing at least two storage-stable pre-mixed aqueous modules (units) is described, in which A) at least one aqueous special effect module containing one or more special effect pigments, one or more anionic and/or non-ionic stabilised water-dilutable binders, one or more organic solvents, at least 20 wt. % of water and optionally conventional lacquer additives, and B) at least one aqueous binder module containing one or more anionic and/or non-ionic stabilised water-dilutable binders, water, and optionally one or more organic solvents, one or more cross-linking agents and/or conventional lacquer additives, are mixed together.

18 Claims, No Drawings

PROCESS FOR PREPARING AQUEOUS COATING AGENTS USING MODULAR SYSTEMS

This is a continuation of application Ser. No. 08/184,587, filed Jan. 21, 1994 now abandoned.

The invention relates to a process for preparing aqueous coating agents with adjustable optical effects using modular systems (mixing systems). It is suitable in particular for preparing long-term storage-stable aqueous special effect base lacquers which may be used in particular for lacquering motor vehicles and motor vehicle parts.

The use of water-dilutable lacquer systems is steadily gaining acceptance in the motor vehicle and motor vehicle parts sector. There is a demand, especially in the area of aqueous special effect base lacquers, for a constantly increasing number of special effect shades, which renders efficient production and storage increasingly difficult. One way to solve this problem is the provision of a limited number of storable individual units, which are combined, depending on the desired special effect shade, to give the final, aqueous special effect base lacquer shortly before application.

Thus, EP-A-399 427 describes a water base lacquer modular system consisting of 5 units which, after combination, produce a final water base lacquer. In this case it is essential, according to the invention, that the special effect unit, the component with metal-containing pigments, must be prepared and stored in the absence of water. This is achieved by slurrying metal-containing pigments in an alkyd, acrylate or polyester resin dissolved in a solvent and an organic solvent. Special effect units prepared in this way do not contain a neutralising agent for acid resins. The water base lacquers formulated therewith thus have an undesired high proportion of solvent and a separate neutralising unit is required. In addition, production of this water base lacquer requires strict observation of the mixing sequence for the individual units.

Furthermore, aqueous lacquers based on different units are described in EP-A-0 468 293 and EP-A-0 471 972. However, it is essential that the special effect unit contains no water.

DE-A-41 10 520 describes a mixing system which is intended to be suitable for preparing aqueous pigmented coating agents with precisely determined shades. It is intended in particular for preparing water base lacquers. The mixing system consists of various basic dyes (A), which contain less than 5 wt. % of water, preferably no water, and pigments, solvents and water-dilutable binders, and a pigment-free aqueous component (B) which contains in particular water-dilutable binders and/or rheological additives. The water-dilutable binders contained in component A are present in solvent form and must be capable of being prepared in solvent form. The water base lacquers formulated in this way therefore have undesired high proportions of solvent. The final coating agents are prepared by mixing the components just before application, they are not storage-stable.

The object of the invention is the provision of a process for preparing aqueous coating agents, in particular for preparing aqueous single-component special effect base lacquers with low solvent contents using a modular system or mixing system or unit system which is stable over a long period of time, wherein the individual modules in the system can easily be mixed with each other in order to produce a desired special effect.

It has been shown that this object can be achieved by the use of a modular system which contains a special effect module with a high water content.

The invention thus provides a process for preparing aqueous coating agents with adjustable optical effects by mixing at least two storage-stable pre-mixed aqueous modules, which is characterised in that A) at least one aqueous special effect module containing one or more special effect pigments, one or more water-dilutable anionic and/or non-ionic stabilised binders, one or more organic solvents, at least 20 wt. % of water and optionally conventional lacquer additives and B) at least one aqueous binder module containing one or more water-dilutable anionic and/or non-ionic stabilised binders, water, optionally one or more organic solvents, and optionally one or more cross-linking agents and/or one or more conventional lacquer additives, are mixed together.

The modular system used according to the invention may contain, in addition to special effect module A) and binder module B), for example, C) at least one dye module containing one or more pigments and/or fillers, one or more anionic and/or non-ionic stabilised, water-dilutable binder and water, and optionally one or more organic solvents and/or conventional lacquer additives, and/or D) at least one rheology module containing one or more organic or inorganic agents for regulating the rheology (rheology components) and water, and optionally one or more water-dilutable anionic and/or non-ionic stabilised binders and/or one or more organic solvents, and/or E) at least one cross-linking module containing one or more cross-linking agents and optionally one or more organic solvents, water, one or more anionic and/or non-ionic stabilised water-dilutable binders and/or one or more conventional lacquer additives.

Here, modules are understood to be storage-stable units (mixing units) which can be stored separately, from which a final coating agent can be prepared by mixing, which optionally can still be adjusted to the application viscosity. By means of mixing the individual modules, desired adjustable special effects, and optionally adjustable shades of colour, can be obtained. The modules could be provided by the manufacturer in the form of a set containing, for example, at least modules A) and B).

Different embodiments may be prepared from each of the modules A) to E). A set of modules is produced in this way which may consist of one or more modules.

Special effect module A) is an aqueous preparation which contains at least one special effect pigment, at least one water-dilutable resin (binder) and at least 20 wt. % of water, a proportion of organic solvents and optionally conventional lacquer additives.

Special effect pigments are those pigments which produce a decorative effect in lacquer coatings and also, but not exclusively, may produce a coloured effect. Special effect pigments are distinguished in particular by a plate-like structure. Examples of special effect pigments are: metallic pigments, e.g. made from aluminium, steel, copper or other metals; interference pigments such as e.g. metal oxide coated metallic pigments, e.g. titanium dioxide coated or mixed oxide coated aluminium, coated micas such as e.g. titanium dioxide coated mica and graphite effect pigments.

A number of these special effect pigments is available commercially and they differ in particle size, particle size distribution and particle shape. The choice of pigment depends on the particular special effect desired in the lacquer film. Special effect modules with only one pigment are preferably prepared. However, it is also possible to prepare special effect modules which contain several different special effect pigments.

Surprisingly, it has been shown, within the scope of the invention, that aqueous modules containing special effect pigments, especially metallic pigments, may be provided for the process according to the invention, wherein the metallic pigments may even consist of water-sensitive metals such as aluminium or steel. It has been shown that this is possible in particular when the special effect module contains 3 to 13 wt. %, especially 3.5 to 4 wt. % of the water-sensitive metallic pigment. The pH is then preferably 7.2 to 8.0, particularly preferably 7.5 to 8.0. The pigment/binder ratio in this case is preferably 0.02:1 to 10:1, with reference to the weight of solids. Due to the provision of this type of aqueous special effect module based on metallic pigments, a lacquer material which has a particularly low solvent content can be provided by the process according to the invention.

The water-dilutable resins contained in the special effect module may carry an anionic charge. Anionic resins in the form of aqueous solutions or dispersions neutralised with bases are available.

The water-dilutable resins contained in the special effect module may also be non-ionically stabilised. For example, those resins which are described later for binder module B) may be used.

In the case of anionic resins, the anionic groups are preferably present as neutralised carboxyl groups, corresponding to an acid value of preferably 15–70 mg KOH/g. Aqueous special effect modules containing anionic resins preferably have a pH of 7.0–9.0.

The resins may be conventional film-forming binders and/or paste resins. They may be based, for example, on polyesters, polyacrylates or polyurethanes, as explained in the description of the set of binder modules. Preferably, polyurethane resins are used as water-dilutable resins in the special effect module.

Water-dilutable or non-water-dilutable cross-linking components may also be contained in the special effect module. These cross-linking components are described in more detail in the description of the cross-linking module.

Preferably, each of the aqueous special effect pigment modules contains the same binder or binder mixture. This means that a constant binder composition can be produced, even when mixing different modules.

Furthermore, the special effect module may contain a small proportion of at least one water-miscible solvent, such as alcohols, e.g. monoalcohols such as butanol, n-propanol or isopropanol; ether alcohols, e.g. butoxyethanol, butoxypropanol or methoxypropanol; dialcohols such as glycols, e.g. ethylene glycol, polyethylene glycol; trialcohols such as glycerol; ketones, e.g. acetone, methylethyl ketone or N-methylpyrrolidone; ethers, e.g. dipropyleneglycol dimethyl ether.

The special effect module preferably contains a rheology regulating agent. These may be the substances or mixtures which are described for the preparation of a rheology module. These may be directly added during preparation of the special effect module or admixed later as a finished rheology module.

Furthermore, conventional lacquer additives such as e.g. wetting agents, defoamers, neutralising agents and catalysts may be contained in the aqueous special effect module.

The aqueous special effect module is generally prepared in such a way that the special effect pigment, e.g. in the form of a commercially available paste, is initially introduced, water-dilutable solvent and additives are added and then the aqueous resin solution is admixed under a shear force. Powdery special effect pigments are first processed with solvent and additives to produce a paste. Care should be taken that platelet-shaped special effect pigments are not mechanically damaged during the mixing process.

Aqueous storage-stable special effect modules with a preferred pigment/binder ratio of 0.02:1 to 10:1 are produced. The solids content of the whole special effect module is then preferably 10 to 40 wt. %. The ratio by weight of water to organic solvent in the aqueous special effect module is preferably 12:1 to 3:1. The water content of the special effect module is at least 20, preferably 20 to 75 wt. %.

Binder B) is an aqueous solution or dispersion of at least one anionic and/or non-ionic stabilised water-dilutable binder. These are film-forming resins or paste resins such as are normally used in aqueous coating agents, especially in aqueous base lacquers. They may be present alone or in combination. The film-forming resins may be based on polyesters, polyacrylates or preferably polyurethanes. They may be self-cross-linked or require an external cross-linking agent or dry out physically.

Examples of suitable non-ionically stabilised binders are those binders whose water-dilutability is achieved by the incorporation of polyether segments into the resin molecule. Examples of this type of stabilised polyurethane or polyurethanacrylate resin are described in EP-A-354 261, EP-A-422 357 and EP-A-424 705.

The aqueous binder module preferably contains anionic stabilised binders. Examples of these are (meth)acrylic copolymers, polyester resins or preferably polyurethane resins.

Examples of suitable water-dilutable (meth)acrylic copolymers can be found in EP-A-399 427 and EP-A-287 144.

Examples of suitable water-dilutable polyester resins are described in DE-A-29 26 584, DE-A-38 32 142 and EP-A-301 300.

It is also possible to use mixtures of such binders. Particularly suitable binders are those in which (meth)acrylic copolymers and polycondensation resin are present bonded covalently or in the form of interpenetrating resin molecules. Examples of these resins as this type of combination of (meth)acrylic copolymers and polyester resin are described in EP-A-226 171.

Examples of the particularly preferred anionic stabilised polyurethane resins are described in great variety in the literature. These are aqueous polyurethane dispersions or solutions or those binders in which (meth)acrylic copolymers and polyurethane resin are present bonded covalently or in the form of interpenetrating resin molecules. Suitable PU dispersions are stable, aqueous dispersions with a solids content of 20 to 50%. The molecular weight ($M_w$) of the resins may vary over wide limits, from 1000 to 500000, wherein the molecular weights of film-forming binders lie in the upper range of numbers and those of paste resins lie in the lower range of numbers.

Examples of polyurethane dispersions which may be prepared by chain-lengthening prepolymers which contain isocyanate functions using polyamines and/or polyols, are found in EP-A-89 497, EP-A-228 003, DE-A-36 28 124 and EP-A-512 524.

Polyurethane dispersions which may be prepared by chain-lengthening prepolymers which contain isocyanate functions using water are described in DE-A-39 15 459.

Particularly preferred polyurethane dispersions of this type are described in P 42 24 617, from the same applicant, which has not yet been laid open for public inspection. These are self-emulsifying polyurethane dispersions which preferably have an acid value, with reference to the solids content, in the non-neutralised state, of 5 to 50, particularly preferably of more than 10 and less than 30. The self-emulsifying urethane resin preferably has a glass transition temperature which is lower than the dispersing temperature. The dispersion may be prepared in such a way that, e.g. a urethane prepolymer is prepared by reacting one or more polyisocyanates (a), preferably diisocyanates, with a polyetherdiol or polyesterdiol (b1) or a mixture thereof, and optionally one or more low-molecular weight polyhydroxyl compounds (b2) and one or more dimethylolalkanoic acids (c) in a NCO/OH ratio by equivalents of 1.1–2.0:1, preferably 1.1–1.9:1, in a single or multi-stage reaction in a hydrophilic organic solvent which contains no active hydrogens. Subsequently chain-lengthening with water takes place, for example in the organic phase, wherein for example 0.5 to 3 moles of water are used per NCO group. The polymers thus obtained may be emulsified in further water after or during neutralisation with an amine and the organic solvent may be distilled off, if necessary.

Examples of polyurethane dispersions which are prepared by chain-lengthening of PU prepolymers which contain active hydrogens which react with polyisocyanates, using polyisocyanates, may be found in DE-A-39 03 804 and DE-A-40 01 841.

Further anionic stabilised polyurethane (PU) dispersions are described in P 42 28 510, from the same applicant, which has not yet been laid open to public inspection. These are aqueous polyurethane resin dispersions which are obtainable by chain-lengthening of one or more polyurethane resins which contain at least one CH-acid group in the molecule by reaction in aqueous or non-aqueous medium with at least one compound which can react with at least two CH-acid groups and optional transfer of a reaction product obtained in non-aqueous medium to the aqueous phase.

The dispersions are preferably prepared solvent-free. The binder preferably still contains reactive functional groups.

The polyurethane resin which contains at least one CH-acid group may be prepared by a variety of methods. This type of CH-acid PU resin is described, for example, in EP-A-0 367 051.

Another method for preparing a dispersion of this type of polyurethane resin is to react a polyurethane resin with at least one ionic group which contains OH groups, which may contain urea groupings, in an anhydrous medium, with at least one compound which has at least one functional group which is suitable for reaction with at least some of the OH groups in the polyurethane resin and in addition contains a CH-acid group and transferring the product obtained to the aqueous phase after neutralisation.

The chains in the dispersions are lengthened before or after transfer to the aqueous phase using a compound which can react with two CH-acid functions. Preferably, however, chain-lengthening is performed in aqueous dispersion.

Compounds suitable for chain-lengthening are those which can react with CH-acid centres. At least a two-fold possibility of reaction must be provided. Examples of such compounds are aldehydes or di- or polyisocyanates. Appropriate chain-lengthening reagents may be used separately or in combination.

Examples of anionic stabilised polyurethane-based binders which are suitable as a component of the aqueous binder module in which (meth)acrylic copolymers and polyurethane resin, bonded covalently or in the form of interpenetrating resin molecules, are present are described, for example, in EP-A-353 797, EP-A-297 576, DE-A-41 22 265 and DE-A-41 22 266. These are polymer hybrids which are prepared by emulsion polymerisation of radically polymerisable monomers in the presence of anionic stabilised polyurethanes which optionally carry unsaturated functions.

These are preferably the type of polyurethane based binder described in DE-A-41 22 265.

These are polyurethane dispersions, prepared by radical-initiated polymerisation of polyurethane macromonomers with a proportion of carboxyl, phosphonic acid or sulphonic acid groups and lateral vinyl groups as well as optional terminal vinyl groups, hydroxyl, urethane, thiourethane and/or urea groups.

These polyurethane dispersions may, in principle, be prepared by a variety of methods. One method comprises, e.g. preparing a polyaddition product by polyaddition of polyhydroxy compounds from the group polyhydroxy-polyethers, polyhydroxy-polyesters and polyhydroxy-polycarbonates, also polyhydroxycarboxylic acids, dihydroxyphosphonic acids or polyhydroxysulphonic acids as well as polyisocyanates and a monomer which contains at least two hydroxyl groups and at least one vinyl group. The proportions of reactants, in particular of polyisocyanate, are selected so that a macromonomer with terminal hydroxyl groups is produced. This macromonomer, which in addition contains carboxyl, phosphonic acid or sulphonic acid groups and lateral vinyl groups, is then neutralised, if the acid groups in the monomers which contained these groups were not used initially in the neutralised form.

To prepare the polyurethane dispersion, the macromonomers thus obtained, which contain vinyl groups, are converted into an aqueous dispersion by the addition of water and polymerised by radical-initiated polymerisation using methods which are known per se. During this polymerisation, if so-called reactive diluters are not present from the start, monomers are added which are then co-polymerised into the polyurethane.

These monomers are alpha,beta-unsaturated monomers. Examples of these are alpha,beta-unsaturated vinyl monomers such as alkylacrylates, -methacrylates and -crotonates with 1 to 20 carbon atoms in the alkyl chain, di-, tri- and tetraacrylates, -methacrylates and -crotonates of glycols, tri- and tetra-functional alcohols, substituted and unsubstituted acryl- and methacrylamides, vinylethers, alpha,beta-unsaturated aldehydes and ketones, vinylalkyl ketones with 1 to 20 carbon atoms in the alkyl chain, vinyl ethers, vinylesters, diesters of alpha,beta-unsaturated dicarboxylic acids, styrene, styrene derivatives, such as e.g. alpha-methylstyrene.

The polyurethane paste resins which are mentioned above, e.g. from DE-A-40 00 889, may also be used as anionic stabilised PU resins in the aqueous binder module B) according to the invention. These are urethanised oil-free polyesters which contain OH groups, prepared by reacting diisocyanates with an excess of a polyol mixture and lower molecular dialcohols, of which some also contain at least one acid group capable of forming an anion. The number average of the molecular mass of these PU binders is preferably 3000 to 200000, particularly preferably less than 50000.

The binder module B) needed to prepare aqueous base lacquers may consist of one aqueous binder. The aqueous binders may also, however, be present in combination. Thus, the binders are each prepared separately and stored as a single module afterwards or they are prepared as a mixture of binders and then stored as a multi-component binder module.

The binder module B) preferably contains aqueous binders based on anionic stabilised polyurethanes. It may be expedient, if some, e.g. up to 50 wt. % of the PU binder, is replaced by resins based on a combination of (meth)acrylic copolymer and polyester resin.

Furthermore, binder module B) may contain water-dilutable binders based on cellulose.

Aqueous binder module B) may also contain amino resins and/or blocked polyisocyanates. The amino resins and blocked polyisocyanates may be water-dilutable or non-water-dilutable and are commented on under the description of the cross-linking module. They are present in a ratio of 40:60 to 5:95 with respect to the water-dilutable binder, each being with reference to the solid resin.

Rheology regulating agents may also be contained. Furthermore, the aqueous binder may contain small proportions of conventional solvents, preferably less than 5 wt. %. These may be the water-miscible solvents described for the special effect module. The solids content of the binder module is preferably 20 to 60 wt. %.

The binder module B) may contain neutralisation agents for the anionic resins. Bases are used for this. Examples are ammonia or organic amines such as triethylamine, N-methylmorpholine, aminoalcohols such as dimethyl-isopropanolamine, dimethylethanolamine, 2-amino-2-methylpropanol-1.

Aqueous binder module units which contain anionic resins have a pH of 7.0–8.5. The ratio of organic solvent to water in the aqueous binder module is up to 0.3:1, preferably less than 0.2:1.

The modular system (made from modules A) and B)) used according to the invention may also include at least one aqueous dye module C), which contains, in addition to at least one anionic and/or non-ionic stabilised water-dilutable binder, dye pigments and/or fillers and optionally additives. Each dye module C) preferably contains not more than 4 different dye pigments and/or fillers, particularly preferred aqueous dye modules being those which contain only one dye pigment or only one filler. Examples of inorganic or organic dye pigments or fillers which can be used in the dye module are titanium dioxide, micronised titanium dioxide, iron oxide pigments, carbon black, silicon dioxide, barium sulphate, micronised mica, talc, azo-dyes, phthalocyanin dyes, quinacridone or pyrrolopyrrole pigments.

The same water-dilutable anionic and/or non-ionic stabilised resins may be used as described for the binder module. These are preferably binders which carry an anionic charge which act as binder components in the final special effect base lacquer. The resins may be based on polyesters, acrylates or polyurethanes. The resins may be paste resins alone or in combination with film-forming binders or cross-linking agents. PU paste resins, as described in DE-A-40 00 889, are particularly preferred.

Each aqueous dye module C) preferably contains the same binder or mixture of binders. In addition, water-dilutable or non-water-dilutable cross-linking components may be contained in the dye module.

Furthermore, the dye module C) may contain small proportions of water-miscible solvents. Bases may also be contained as neutralisation agents. It may be convenient if dye module C) contains rheology regulating agents. Furthermore, conventional lacquer additives, such as e.g. wetting agents, defoamers and flow controllers, may be contained in aqueous dye module C).

The aqueous dye modules C) are generally prepared in such a way that the dye pigment or filler is ground into some of the aqueous binder or preferably into a paste resin. This takes place in equipment which is known to the person skilled in the art. Afterwards, the remaining amount of water-dilutable resin is added. This may be the same or a different binder from that used in the dispersing stage.

Aqueous, storage-stable dye modules C) are produced with a pigment/binder ratio of 0.01:1 to 10:1. The solids content is preferably 20 to 80 wt. %.

Dye modules which contain anionic resins have a pH of 7.0 to 10.0. The ratio of organic solvent to water in the aqueous dye modules is up to 0.3:1, preferably up to 0.2:1.

The modular system used according to the invention may contain a rheology module D). This contains water and one or more substances which regulate the flow behaviour of the final special effect base lacquer as a rheology component.

Examples of these are polymeric microparticles, such as are described, for example, in EP-A-38 127, inorganic sheet silicates, e.g. aluminium magnesium silicate, sodium magnesium sheet silicate and sodium magnesium fluorolithium sheet silicates of the montmorillonite type, associative thickeners, based on e.g. polyurethane or cellulose, polyvinylalcohols, synthetic polymers with ionic groups such as e.g. poly(meth)acrylic acid. These substances are commercially obtainable in a variety of forms.

The modular system used according to the invention may also contain a cross-linking module E). The cross-linking module E) is used in particular when the final aqueous special effect base lacquer being produced is being prepared with the use of resins which contain cross-linkable groups in the molecule.

Examples of cross-linking resins contained in the cross-linking module are amino resins and/or blocked isocyanates. These are partially or completely etherified amine/formaldehyde condensation resins and/or blocked polyisocyanates with at least two reactive sites per molecule.

Such amino resins are described, for example, in Ullmann's "Encyclopedia of Industrial Chemistry", 5th ed., vol, A2, chapter "Amino resins", pages 115–141 (1985) and Houben-Weyl, "Methoden der Organischen Chemie", vol. 14/2, pages 319–388 (1962). The resins are prepared according to the prior art and supplied by many firms as commercial products.

Examples of such amino resins are amine/formaldehyde condensation resins which are produced by the reaction of aldehydes with melamine, guanamine, benzoguanamine or dicyanodiamide. The alcohol groups in the aldehyde condensation products are then partially or completely etherified with alcohols.

Examples of blocked isocyanates are any di- and/or polyisocyanates in which the isocyanate groups have been reacted with a compound which contains active hydrogen. Appropriate prepolymers which contain isocyanate groups may also be used as di- and/or polyisocyanates. The organic di- and/or polyisocyanates have an average molecular weight of 112 to 2000 and expediently an average isocyanate functionality of 2 to 8. These are e.g. aliphatic, cycloaliphatic, aromatic, optionally also sterically hindered polyisocyanates. So-called "lacquer polyisocyanates" which are prepared from known diisocyanates are particularly suitable as polyisocyanates.

Typical examples of this type of polyisocyanate are propylene diisocyanate, tetramethylxylylene diisocyanate, trimethylene diisocyanate, hexamethylene diisocyanate, trimethylhexane diisocyanate, cyclohexene-1,3 and -1,4 diisocyanate, methylcyclohexane diisocyanate, 4,4'- diphenylmethane diisocyanate, isophorone diisocyanate or dicyclohexylmethane diisocyanate.

Isocyanates which are convenient to use are polyisocyanates which also have urethane groups, which can be obtained by reacting excess amounts of diisocyanate with simple polyhydric alcohols with a molecular weight of 62 to 300, especially trimethylolpropane.

Lower molecular weight compounds for blocking NCO groups are known. Examples of these are aliphatic or cycloaliphatic alcohols, dialkylamino alcohols, oximes, lactams, imides, hydroxyalkyl esters, malonates or acetoacetates.

The cross-linking module may contain the cross-linking agent alone. However, it may also contain one or more organic solvents, water, one or more anionic and/or non-ionic stabilised, water-dilutable binders and/or one or more conventional lacquer additives. These are, for example, the same as those described for the other modules.

The different modules are storage-stable. They may be used in the modular system according to the invention. Furthermore, it is possible to mix several identical or different modules to give new storage-stable combination modules. For example, different special effect and/or dye modules may be mixed. Likewise, cross-linking modules and binder modules may be mixed. Likewise, the rheology module may be mixed with the special effect or the dye module. It has been shown to be expedient to select a modular system for mixing coating agents in which the special effect module and binder module and optionally the dye module are kept as separate entities. The rheology and/or cross-linking module may be present as separate entities or mixed with the other modular units.

The aqueous single component special effect base lacquer is prepared by simply mixing the special effect module with the binder module and optionally the dye module and/or the rheology module and/or the cross-linking module. Any sequence may be used for admixing, preferably, however, the module with the highest viscosity and the largest share of the volume is initially introduced. After mixing well, the application viscosity is adjusted by the addition of deionised water.

The final special effect base lacquer prepared according to the invention has a solids content of preferably 10–40 wt. %, particularly preferably 15–30 wt. %, with a pigment/binder ratio of 0.06:1 to 0.6:1. The resin composition in the lacquer solids is preferably kept constant in each individual special effect base lacquer, wherein in the case of those special effect base lacquers which contain cross-linking agents there is a ratio of film-forming binder to cross-linking resins of 95:5 to 60:40 within the solid resin composition.

The proportion of solvent is less than 20 wt. %, preferably less than 10 wt. %. The pH of the aqueous base lacquer is the result of mixing the modular units. A correction to the pH is generally not required.

The final aqueous special effect base lacquer may be applied directly after mixing, but it may also be stored for longer than 12 months.

The aqueous special effect base lacquers prepared according to the invention may be applied using conventional methods. They are preferably applied by spraying in a dry layer thickness of 10–25 µm and processed using a wet-on-wet method, that is they are over-lacquered after an evaporation phase at 20°–80° C., using a conventional clear lacquer in a dry layer thickness of preferably 30–60 µm, and dried or cross-linked in common with this at temperatures between 20° and 140° C.

The multi-layered special effect lacquers obtained in this way correspond to the currently conventional requirements for motor vehicle lacquers. The aqueous special effect base lacquers prepared according to the invention are thus suitable for lacquering vehicles and vehicle repairs, but they may also be used in other areas, such as e.g. lacquering plastics, in particular for lacquering motor vehicle parts.

The modular system used according to the invention consists of individual storage-stable modules. The modules contain film-forming binders which can be prepared in solvent form or in the aqueous phase. Low-solvent, aqueous, special effect base lacquers which have good long-term storage stability, can be prepared using the modular system used according to the invention. In particular, efficient storage and production of the aqueous special effect base lacquer is achieved.

The following examples explain the invention. All parts (P) refer to parts by weight.

EXAMPLE 1

Preparation of a PU dispersion in accordance with DE patent application P 42 24 617, which is not yet laid open to public inspection, preparation example 3:

1005 g of a linear polyester (formed from adipic acid, isophthalic acid and hexanediol with an OH value of 102) are heated to 90° C. in a reaction vessel with a stirrer, internal thermometer, heat-supply and reflux condenser and 1.8 g of trimethylolpropane and 393 g of isophorone diisocyanate are added at this temperature. The mix is held at this temperature until the NCO value is 3.8. After cooling to 60° C., a solution of 35.3 g of dimethylolpropionic acid, 26.1 g of triethylamine and 250 g of N-methylpyrrolidone are added. After heating to 80° C., the temperature is kept constant until an NCO value of 1.5 is reached. The molar amount of deionised water is admixed and the solution is held at 80° C. until isocyanate can no longer be detected. Finally, the mix is diluted with enough water to produce a liquid dispersion with a solids content of 34 wt. %.

EXAMPLE 2

Preparation of a special effect module A

The following components are contained in the special effect module:

- 32.0 parts of a conventional polyurethane dispersion (in accordance with DE-A-4122265, example 1) with 35 wt. % SC (SC=solids content),
- 13.4 parts of a commercially available aluminium paste containing 60 % aluminium, suitable for water base lacquers,
- 1.3 parts of an aluminium wetting additive based on organic phosphoric acid derivatives,
- 7.7 parts of n-butanol,
- 3.3 parts of a commercially available thickener based on polyacrylic acid,
- 3.3 parts of N,N-dimethylethanolamine.

The aluminium paste is initially introduced and mixed into a slurry with the solvent and additives. The binder is then added and mixed well.

EXAMPLE 3

Preparation of a special effect module B 35 parts of the PU dispersion from example 1, 20 parts of the aluminium paste from example 2, 2 parts of the wetting additive from example 2, 25 parts of butyl glycol, 1.8 parts of the thickener from example 2 and 0.2 parts of N,N-dimethylethanolamine are processed using the same method as in example 2. Afterwards, the mixture is diluted with 16 parts of deionised Water.

EXAMPLE 4

Preparation of a binder module A

The following components are well mixed together with stirring:

42.0 parts of a conventional polyurethane dispersion (in accordance with DE-A-4122265, example 1) with 35% SC, 47.0 parts of completely demineralised water, 2.3 parts of n-butanol, 6.0 parts of butyl glycol, 1.4 parts of a commercially available thickener based on polyacrylic acid, 1.3 parts of N,N-dimethylethanolamine.

EXAMPLE 5

Preparation of a binder module B 26.2 parts of the PU dispersion from example 1, 8.8 parts of hexamethoxymethylmelamine, 5 parts of n-butanol, 3.5 parts of the thickener from example 2, 0.25 parts of N,N-dimethylethanolamine and 56.25 parts of deionised water were mixed together in the same way as in example 4.

EXAMPLE 6

Preparation of a blue dye module A

The dye module contains the following components:

| | |
|---|---|
| 42.0 | parts of a conventional polyurethane paste resin (in accordance with DE-A-4000889) with 35% SC, |
| 34.0 | parts of a commercial blue copper phthalocyanine pigment, |
| 5.0 | parts of a dispersion aid (Disperse Ayd W22), |
| 18.85 | parts of completely demineralised water, |
| 0.15 | parts of N,N-dimethylethanolamine. |

First, the pigment is made into a slurry in a mixture of additives and about half of the paste resin. Then the rest of the paste resin, amine and water are added and well mixed.

EXAMPLE 7

Preparation of a green dye module B 45 parts of the paste resin from example 6, 30 parts of a commercially available green phthalocyanine pigment, 5 parts of the dispersion aid from example 6, 2 parts of butyl glycol, 17.9 parts of deionised water and 0.1 parts of N,N-dimethylethanolamine are processed in the same way as in example 6.

EXAMPLE 8

Preparation of aqueous special effect base lacquers

Storage-stable special effect base lacquers are prepared by smoothly stirring together the modules cited in the Table:

| SPECIAL EFFECT BASE LACQUERS | | | | |
|---|---|---|---|---|
| | A (silver metallic) | B (silver metallic) | C (blue metallic) | D (green metallic) |
| Binder module A | 70 P | | 60 p | |
| Binder module B | | 80 P | | 75 P |
| Sp. effect mod. A | 30 P | | 20 P | |
| Sp. effect mod. B | | 20 P | | 15 P |
| Dye module A | | | 20 P | |
| Dye module B | | | | 10 P |

P = parts by weight

We claim:

1. A process for preparing an adjustable optical effect aqueous coating agent comprising:

selecting at least one storage-stable, premixed, aqueous, special effect module A and at least one storage-stable, premixed, aqueous, binder module B, and mixing at least modules A and B to form the coating agent, wherein the aqueous special effect module A comprises at least one special effect pigment, at least one anionic or non-ionic stabilized water-dilutable polyurethane binder or a combination or at least one anionic binder and at least one non-ionic binder, at least one organic solvent and at least 20 wt-% of water, and the binder module B comprises at least one anionic or non-ionic stabilized water-dilutable polyurethane binder or a combination of at least one anionic binder and at least one non-ionic binder and water.

2. A process according to claim 1 wherein the special effect pigment of special effect module A is metallic pigment or interference pigment or a combination thereof.

3. A process according to claim 1 wherein the binder of the special effect module A is at least one anionic stabilized water dilutable binder and the pH of the special effect module A is about 7 to about 9.

4. A process according to claim 1 wherein the special effect module A contains exclusively at least one metallic pigment as the special effect pigment, the metallic pigment content is from about 3 to about 13 wt % relative to the total weight of the components in module A, and the pigment to binder ratio of module A is from about 0.02:1 to about 10:1.

5. A process according to claim 1 wherein the special effect pigment of special effect module A is water-sensitive metallic pigment and module A has a pH of about 7.2 to 8.0.

6. A process according to claim 5 wherein the water sensitive metallic pigment is aluminum or steel or both.

7. A process according to claim 5 wherein the binder of special effect module A is at least one anionic stabilized binder.

8. A process according to claim 1 wherein special effect module A further comprises at least one conventional lacquer additive.

9. A process according to claim 1 wherein binder module B further comprises at least one organic solvent and at least one cross-linking agent.

10. A process according to claim 1 wherein more than one special effect module A is selected and each special effect module A contains the same binder or mixture of binders.

11. A process according to claim 1 wherein special effect module A has a water content of at least 50 wt % relative to the total weight of the module.

12. A process according to claim 1 wherein the binder of special effects module A or binder module B or both is at least one polyurethane resin.

13. A process according to claim 1 further comprising:

selecting at least one additional module from the group of modules consisting of a dye module C, a rheology module D, a cross-linking module E and any combination thereof; and, mixing the selected additional module(s) with modules A and B, wherein the dye module C comprises at least one pigment or filler or both, at least one anionic or non-ionic stabilized water-dilutable binder or a combination of the anionic binder and the non-ionic binder;

the rheology module D comprises at least one organic or inorganic agent for regulating rheology, and water; and, the cross-linking module E comprises at least one cross-linking agent.

14. A process according to claim 13 wherein the dye module C further comprises at least one organic solvent, the rheology module D further comprises at least an anionic or non-ionic stabilized water-dilutable binder or a combination of the anionic binder and the non-ionic binder, and at least one organic solvent, and, the cross-linking module E further comprises at least one organic solvent, water and at least one anionic or non-ionic stabilized water-dilutable binder or a combination of the anionic binder and the non-ionic binder.

15. A process according to claim 13 wherein dye module C has a solids content of about 20 to about 80 wt. %.

16. A process according to claim 13 wherein the cross-linking module E contains at least on blocked isocyanate or at least one amine resin as the cross-linking agent.

17. A process according to claim 1 wherein the modules are mixed in proportions such that a coating agent containing less that 20 wt. % of organic solvent is produced.

18. A process according to claim 13 wherein the modules are mixed in proportions such that a coating agent containing less that 20 wt. % of organic solvent is produced.

* * * * *